US008845474B2

(12) United States Patent
Kochidomari et al.

(10) Patent No.: US 8,845,474 B2
(45) Date of Patent: Sep. 30, 2014

(54) FOUR WHEEL DRIVE VEHICLE

(71) Applicant: Kanzaki Kokyukoki Mfg. Co., Ltd., Hyogo (JP)

(72) Inventors: Yoshitaka Kochidomari, Amagasaki (JP); Eiji Kashu, Amagasaki (JP); Tomoyuki Ebihara, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 14/193,735

(22) Filed: Feb. 28, 2014

(65) Prior Publication Data

US 2014/0248994 A1 Sep. 4, 2014

(51) Int. Cl.
*F16H 37/08* (2006.01)
*B60K 23/08* (2006.01)

(52) U.S. Cl.
CPC ..................... *B60K 23/08* (2013.01)
USPC ........................................................ 475/202

(58) Field of Classification Search
USPC ......... 475/202, 220, 221, 203, 200, 205, 198, 475/206; 180/233, 247; 74/665 F, 665 G, 74/665 R
See application file for complete search history.

(56) References Cited

U.S. PATENT DOCUMENTS

| | | | |
|---|---|---|---|
| 7,028,801 B2 * | 4/2006 | Ima ............................... | 180/244 |
| 8,256,328 B2 * | 9/2012 | Stephens et al. ............. | 74/665 F |
| 8,562,479 B2 * | 10/2013 | Hamperl et al. .............. | 475/221 |
| 8,607,666 B2 * | 12/2013 | Stephens et al. ............. | 74/665 F |
| 8,696,510 B2 * | 4/2014 | Arai .............................. | 475/220 |
| 2010/0120565 A1 | 5/2010 | Kochidomari et al. | |

FOREIGN PATENT DOCUMENTS

| | | |
|---|---|---|
| JP | 3684221 B2 | 6/2005 |
| JP | 2012-171609 A | 9/2012 |

* cited by examiner

*Primary Examiner* — Saul Rodriguez
*Assistant Examiner* — David J Hlavka
(74) *Attorney, Agent, or Firm* — Sterne Kessler Goldstein & Fox P.L.L.C.

(57) ABSTRACT

In a four-wheel drive vehicle, a first transaxle is disposed on one of front and rear sides of a power unit so as to be drivingly connected to one of front and rear ends of a transmission output shaft of the power unit. A second transaxle is disposed on the other of the front and rear sides of the power unit. A clutch-brake unit includes a clutch and a parking brake. An input shaft of the second transaxle is divided in the clutch-brake unit into upstream and downstream divisional shafts. The upstream divisional shaft is drivingly connected to the other of the front and rear ends of the transmission output shaft. The downstream divisional shaft is drivingly connected to right and left second drive wheels carried by the second transaxle. The clutch is interposed between the upstream and downstream divisional shafts. The parking brake is disposed on the upstream divisional shaft. When the parking brake is shifted to a braking state, the clutch having been disengaged is automatically engaged.

4 Claims, 14 Drawing Sheets

FOUR WHEEL DRIVE VEHICLE

CROSS-REFERENCE TO RELATED APPLICATIONS

The present application claims priority to Japanese Patent Application No. 2013-040916, filed on Mar. 1, 2013.

BACKGROUND OF THE INVENTION

1. Field of the Invention

The present invention relates to a four-wheel drive vehicle such as a utility vehicle.

2. Related Art

As disclosed by US 2010/0120565 A and JP 2012-171609 A, a conventional four-wheel drive vehicle that is adaptable as a utility vehicle is equipped with a power unit and front and rear transaxles. The power unit includes a prime mover (e.g., an engine), a speed-changing gear transmission and a belt (or sprocket) type transmission interposed between the prime mover and the speed-changing gear transmission.

The front and rear transaxles carry drive wheels provided with respective brakes. The vehicle is provided with a manipulator such as a brake pedal for braking all the drive wheels with all the brakes. However, the brakes have small capacities because the drive wheels have small spaces for mounting the respective brakes. If the vehicle has to be stopped on a slope, the insufficient braking force applied on all the drive wheels by all the brakes may cause the vehicle to unexpectedly descend the slope.

In this regard, as disclosed by Japanese Patent No. 3684221 (hereinafter, referred to as '221), a conventional four-wheel drive vehicle is equipped with the power unit and front and rear transaxles, and with a parking brake on the rear transaxle. This parking brake assists the braking of drive wheels with brakes provided on the respective drive wheels. The reference '221 also suggests that a power take-off shaft provided with the parking brake may be divided into front and rear divisional shafts and a clutch for selecting a drive mode of the vehicle between a 2WD (two-wheel drive) mode and a 4WD (four-wheel drive) mode may be interposed between the divisional shafts. However, the reference '221 does not suggest any association of the clutch with the parking brake.

If the vehicle set in the 2WD mode has to be stopped on a slope, an operator will manipulate the braking manipulator (such as the brake pedal) for braking all the drive wheels with the respective brakes, and may further manipulate a parking brake manipulator for activating the parking brake, however, the braking force caused by the parking brake is applied to only the two drive wheels receiving the output power from the power unit. The remaining two drive wheels that are isolated from the output power of the power unit by disengaging the drive mode selection clutch are braked by only the respective brakes without the parking brake. This braking of the remaining drive wheels without the parking brake may be insufficient to surely stop the vehicle on a vehicle, thereby causing the vehicle to unexpectedly descend.

To surely stop the vehicle on the slope, an operator may have to manipulate for shifting the drive mode selection clutch to the 4WD mode state in addition to the braking manipulation for all the brakes on the drive wheels and the parking brake manipulation for the parking brake so as to apply the parking brake force caused by the parking brake to all the drive wheels. However, an operator is liable to forget such an additional manipulation for the drive mode selection clutch, thereby causing the insufficient parking brake because the vehicle is left in the 2WD mode.

SUMMARY OF THE INVENTION

An object of the invention is to provide a four-wheel drive vehicle where all wheels are surely braked by a parking brake operation even if it is set in a two-wheel drive mode, while ensuring a required compactness, especially in the fore-and-aft direction of the vehicle.

To achieve the object, a four-wheel drive vehicle comprises a power unit, first and second transaxles and a clutch-brake unit. The power unit includes a prime mover, an endless belt type first transmission driven by the prime mover, and a second transmission driven by the first transmission. The second transmission includes a transmission output shaft extended fore-and-aft of the vehicle. The first transaxle carrying right and left first drive wheels is disposed on one of front and rear sides of the power unit so as to be drivingly connected to one of front and rear ends of the transmission output shaft. The second transaxle carrying right and left second drive wheels is disposed on the other of the front and rear sides of the power unit. The second transaxle includes a transaxle input shaft having an upstream divisional shaft and a downstream divisional shaft that are disposed coaxially to each other. The upstream divisional shaft is drivingly connected to the other of the front and rear ends of the transmission output shaft. The downstream divisional shaft is drivingly connected to the right and left second drive wheels. The clutch-brake unit includes a clutch and a parking brake. The transaxle input shaft is divided in the clutch-brake unit into the upstream divisional shaft and the downstream divisional shaft. The clutch is interposed between the upstream and downstream divisional shafts and is shiftable between an engagement state for drivingly connecting the downstream divisional shaft to the upstream divisional shaft and a disengagement state for isolating the downstream divisional shaft from a torque of the upstream divisional shaft. The parking brake is disposed on the upstream divisional shaft and is shiftable between a braking state for braking the upstream divisional shaft and an unbraking state for unbraking the upstream divisional shaft. The clutch is associated with the parking brake so that when the parking brake is shifted to the braking state, the clutch having been set in the disengagement state is automatically shifted to the engagement state.

Therefore, the automatic shift of the clutch according to the shift of the parking brake is advantageous to surely apply the braking force caused by the parking brake to all the drive wheels without manipulation for engaging the clutch, thereby relaxing an operator because the operator does not have to notice the manipulation for engaging the clutch before the parking brake is shifted to the braking state. Therefore, even if the vehicle left in the 2WD mode is going to be stopped on a slope, all the drive wheels are surely provided with the braking force caused by the parking brake so that the vehicle surely stops on the slope.

Preferably, the second transaxle includes a limited slip differential unit that differentially connects the right and left second drive wheels to each other while the limited slip differential unit restricts the differential rotatability of the right and left second drive wheels.

Therefore, when the limited slip differential unit receives the braking force caused by the parking brake via the engaged clutch, the limited slip differential unit surely transmits both the right and left second drive wheels because of the restriction of the differential rotatability of the right and left second drive wheels.

Alternatively, preferably, the second transaxle includes a differential unit differentially connecting the right and left second drive wheels to each other. The differential unit is provided with a differential locking system that is shiftable between a locking state for preventing the right and left second drive wheels from differentially rotating and an unlocking state for allowing the right and left second drive wheels to differentially rotate. The differential locking system is associated with the parking brake so that the differential locking system having been set in the unlocking state is shifted to the locking state according to the shift of the parking brake to the braking state.

Therefore, the automatic shift of the differential locking system according to the shift of the parking brake is advantageous to further surely apply the braking force caused by the parking brake to both the right and left second drive wheels without manipulation for shifting the differential locking system to the locking state, thereby relaxing an operator because the operator does not have to notice the manipulation for shifting the differential locking system when the parking brake is shifted to the braking state and the clutch is shifted to the engagement state. Therefore, even if the vehicle falls in a situation where the right and left second drive wheels unevenly receive a driving force or a braking force from the differential unit, the differential locking system automatically locks the differential rotation of the right and left second drive wheels so as to apply the braking force caused by the parking brake to both the second drive wheels.

Preferably, the second transaxle is more distant from the power unit in the fore-and-aft direction of the vehicle than the first transaxle so that a propeller shaft is interposed between the transmission output shaft and the upstream divisional shaft so as to drivingly connect the upstream divisional shaft to the transmission output shaft.

Therefore, the distance of the second transaxle from the power unit ensures a sufficient space for arranging the clutch-brake unit between the second transaxle and the power unit while the propeller shaft ensures the driving connection of the upstream divisional shaft to the transmission output shaft.

These, further and other objects, features and advantages of the invention will appear more fully from the following detailed description of the invention with reference to the attached drawings.

DETAILED DESCRIPTION OF THE INVENTION

Figure 1:
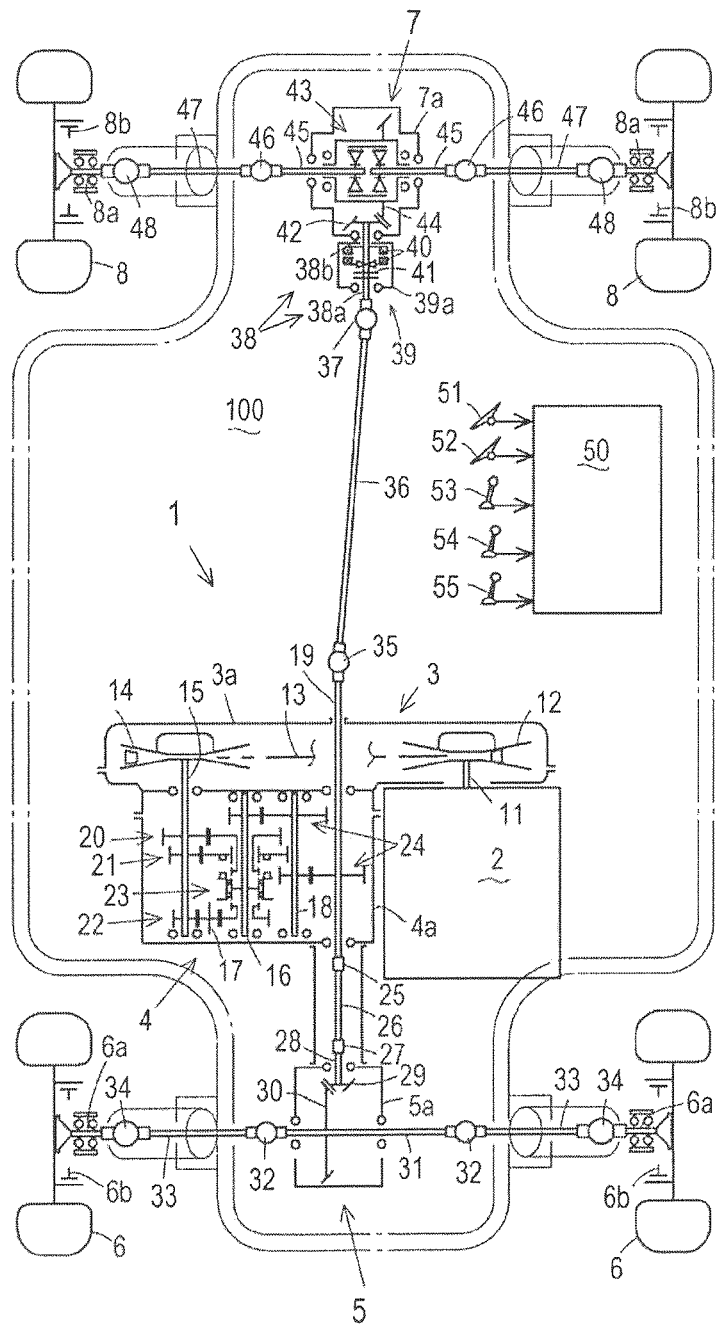
FIG. 1 is a skeleton diagram of a four-wheel drive vehicle including a power unit, front and rear transaxles and a clutch-brake unit.

Referring to FIG. 1, a four-wheel drive vehicle 100 will be described. Vehicle 100 includes a power unit 1, a rear transaxle 5 and a front transaxle 7. Power unit 1 includes an engine 2 serving as a prime mover, a belt type continuously variable transmission (CVT) 3 serving as a first transmission driven by the prime mover, and a gear transmission 4 serving as a second transmission driven by the first transmission. In other words, CVT 3 serves as a main speed changing transmission, and gear transmission 4 serves as an auxiliary speed changing transmission and a reverser.

Rear transaxle 5 carrying right and left rear drive wheels 6 is disposed on a rear side of power unit 1 so as to serve as a first transaxle carrying right and left first drive wheels. Right and left rear drive wheels 6 are provided with respective brakes 6b. Front transaxle 7 carrying right and left front drive wheels 8 is disposed on a front side of power unit 1 so as to serve as a second transaxle carrying right and left second drive wheels. Right and left front drive wheels 8 are provided with respective brakes 8b.

Vehicle 100 includes a controller 50 for electrically controlling various output devices in vehicle 100. Vehicle 100 is equipped with manipulators including an accelerator pedal 51 for controlling a rotary speed of engine 2, a brake pedal 52 for operating brakes 6b and 8b, a speed control lever 53 for controlling speed gears and a reverser in gear transmission 4, a drive mode selection lever 54 for operating a later-discussed drive mode selection clutch 40, and a parking brake lever 55 for operating a later-discussed parking brake 41. Detection signals for operational positions of these manipulators 51, 52, 53, 54 and 55 are inputted to controller 50, and controller 50 outputs command signals to the corresponding output devices based on the inputted detection signals, thereby electrically controlling the output devices.

Any type manipulator can serve as each of manipulators 51, 52, 53, 54 and 55. For example, instead of parking brake lever 55, a pedal or a switch may be a manipulator for operating parking brake 41. Alternatively, the output devices may be controlled by operating these manipulators without electric control by controller 50. For example, accelerator pedal 51 may be operably connected to a throttle of engine 2 via a mechanical link, and speed control lever 53 may be operably connected to a later-discussed shifter 23 via a mechanical link.

Power unit 1 including engine 2, CVT 3 and gear transmission 4 will be described. Engine 2 and gear transmission 4 are juxtaposed right and left. A CVT casing 3a of CVT 3 is disposed along front surfaces of engine 2 and gear transmission 4. An engine output shaft 11 of engine 2 and a transmission input shaft 15 of gear transmission 4 are extended horizontally forward into CVT casing 3a. In CVT casing 3a, a variable drive pulley 12 is provided on engine output shaft 11, a variable driven pulley 14 on transmission input shaft 15, and a belt 13 is interposed between pulleys 12 and 14.

Incidentally, the layout of engine 2, CVT 3 and gear transmission 4 in power unit 1 is not limited to that shown in FIG. 1. For example, in an alternative embodiment of FIG. 2, engine 2 is disposed forward from CVT 3, and gear transmission 4 is disposed rearward from CVT 3, so that in the lateral direction of power unit 1, transmission input shaft 15 projecting forward from transmission casing 4a to serve as a pulley shaft 15 of driven pulley 14 in CVT casing 3a is closer to a later-discussed transmission output shaft 19 of gear transmission 4 than engine output shaft 11 projecting rearward from engine 2 to serve as a pulley shaft 11 of drive pulley 12 in CVT casing 3a.

Figure 2:
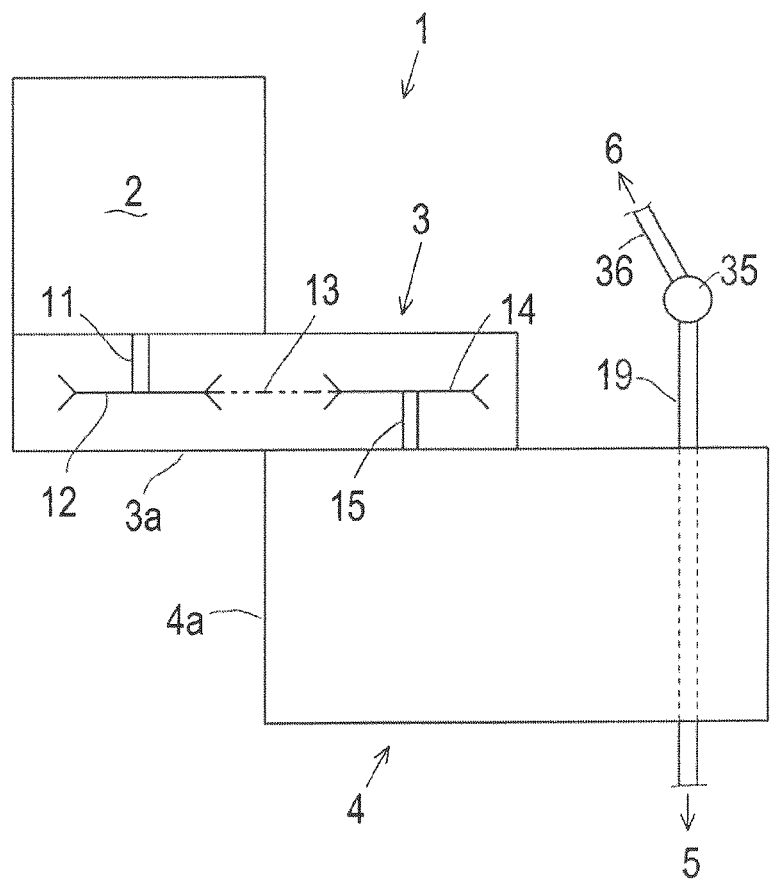
FIG. 2 is a skeleton diagram of an alternative power unit.

In comparison with power unit 1 of FIG. 1 having a later-discussed alignment of shafts 11, 15 and 19 in the lateral direction of power unit 1 such that transmission output shaft 19 of gear transmission 4 is disposed between engine output shaft 11 and transmission input shaft 15 so as to need passing through CVT casing 3a, power unit 1 of FIG. 2 is advantageous because shafts 11, 15 and 19 are aligned in the lateral direction of power unit 1 so that transmission input shaft 15 is disposed between engine output shaft 11 and transmission output shaft 19. In other words, transmission output shaft 19 is disposed outside of the space in CVT casing 3a between engine output shaft 11 and transmission input shaft 15, whereby CVT casing 3a does not have to be formed with a portion for passing transmission output shaft 19 between pulley shafts 11 and 15.

Referring again to FIG. 1, controller 50 controls a rotary speed of engine output shaft 11 in response to a depression degree of accelerator pedal 51. CVT 3 changes widths of grooves of pulleys 12 and 14 automatically in response to the rotary speed of engine output shaft 11, thereby adjusting a rotary speed ratio of transmission input shaft 15. In other words, accelerator pedal 51 mainly serves as a manipulator for controlling the engine rotary speed and auxiliary serves as a main speed changing manipulator.

Gear transmission 4 is provided with a transmission casing 4a. Transmission input shaft 15, a transmission counter shaft 16, an idle shaft 17, a reduction counter shaft 18 and a transmission output shaft 19 are extended horizontally fore-and-aft and journalled in transmission casing 4a.

A high speed forward gear train 20, a low speed forward gear train 21, and a reverse gear train 22 are disposed in transaxle casing 4a and are interposed between transmission input shaft 15 and transmission counter shaft 16. Drive gears of gear trains 20, 21 and 22 are fixed on transmission input shaft 15. Driven gears of gear trains 20, 21 and 22 are fitted on transmission counter shaft 16 rotatably relative to transmission counter shaft 16. Incidentally, in this embodiment, the driven gear of low speed forward gear train 21 is fitted on the driven gear of high speed forward gear train 20 rotatably relative to the driven gear of high speed forward gear train 20. The driven gears of high speed and low speed forward gear trains 20 and 21 mesh with the respective drive gears so as to constitute high speed forward gear train 20 and low speed gear train 21. The drive and driven gears of reverse gear train 22 mesh with each other via an idle gear on idle shaft 17 so as to constitute reverser gear train 22.

A shifter 23 is fitted on transmission counter shaft 16 so as to be unrotatable relative to transmission counter shaft 16 and so as to be axially slidable along transmission counter shaft 16, thereby being shiftable among four positions, i.e., a low speed forward position to mesh with the driven gear of low speed forward gear train 21, a high speed forward position to mesh with the driven gear of high speed forward gear train 20, a neutral position to mesh with none of the driven gears and a reverse position to mesh with the driven gear of reverse gear train 22. The shift of shifter 23 among the four positions is electrically controlled by controller 50 based on the detection of the operational position of speed control lever 53. Due to the position selection of shifter 23, it is selected whether transmission counter shaft 16 is driven or not, whether the rotary direction of transmission counter shaft 16, if driven, is forward or reverse, and whether the rotary speed of transmission counter shaft 16, if driven in the forward direction, is high or low.

A reduction gear train 24 including reduction counter shaft 18 is interposed between transmission counter shaft 16 and transmission output shaft 19 so as to transmit power from transmission counter shaft 16 to transmission output shaft 19.

A rear end of transmission output shaft 19 projects rearward from a rear end portion of transmission casing 4a. A front end of a propeller shaft 26 is joined to the rear end of transmission output shaft 19 via a spline coupler sleeve 25 unrotatably relative to transmission output shaft 19 and is coaxially extended rearward from transmission output shaft 19. A rear transaxle input shaft 28 projects forward from a rear transaxle casing 5a of rear transaxle 5 so that a front end of rear transaxle input shaft 28 is joined to a rear end of propeller shaft 26 via a spline coupler sleeve 27 unrotatably relative to propeller shaft 26.

A bevel pinion 29 is fixed on a rear end of rear transaxle input shaft 28 in rear transaxle casing 5a. A rear transaxle output shaft 31 is extended laterally horizontally and is journalled in rear transaxle casing 5a. A bevel gear 30 is fixed on rear transaxle output shaft 31 in rear transaxle casing 5a and meshes with bevel pinion 29. Right and left ends of rear transaxle output shaft 31 project rightward and leftward from rear transaxle casing 5a and are joined to respective axles 6a of rear drive wheels 6 via respective propeller shafts 33 and universal joints 32 and 34. Therefore, rear transaxle 5 having no differential unit constantly and evenly distributes the rotary power of transmission output shaft 19 to right and left drive wheels 6.

Transmission output shaft 19 projects forward from transmission casing 4a and passes through CVT casing 3a of CVT 3 so that a front end of transmission output shaft 19 projects forward from CVT casing 3a. In this regard, belt 13 has upper and lower portions 13a and 13b (see FIGS. 14 and 15) between pulleys 12 and 14, and transmission output shaft 19 passes through a space surrounded upper and lower portions 13a and 13b of belt 13 and pulleys 12 and 14, thereby passing through CVT casing 3a. The front end of transmission output shaft 19 is joined to a rear end of a propeller shaft 36 via a universal joint 35. A front end of propeller shaft 36 is joined to a rear end of a front transaxle input shaft 38 of front transaxle 7 via a universal joint 37.

Figure 3:
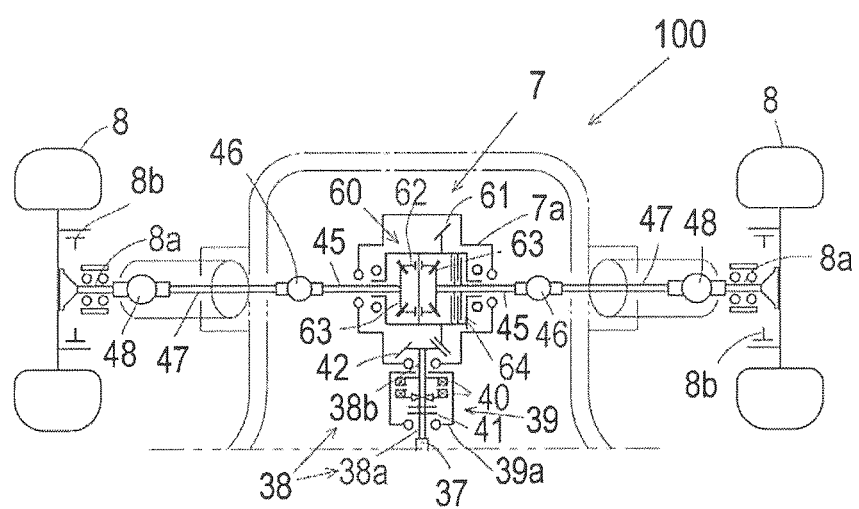
FIG. 3 is a skeleton diagram of an alternative front transaxle and the clutch-brake unit adaptable to the vehicle of FIG. 1.
Figure 4:
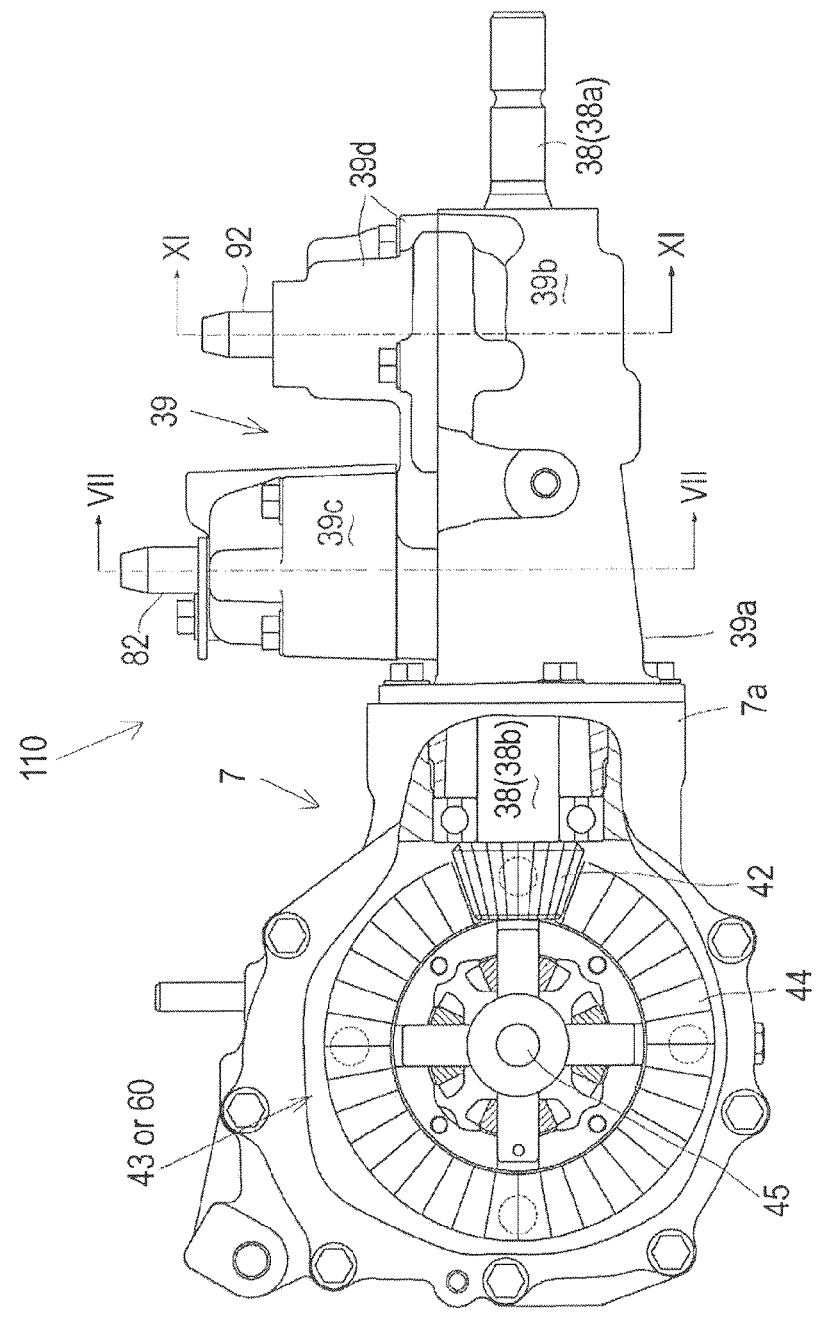
FIG. 4 is a side view of a drive unit as a combination assembly of the front transaxle and the clutch-brake unit, involving a sectional side view of a differential unit in the front transaxle.

Referring to FIGS. 1 and 3, front transaxle 7 provided with a clutch-brake unit 39 will be described. In a clutch-brake unit casing 39a, fore-and-aft horizontal front transaxle input shaft 38 is divided into a rear upstream divisional shaft 38a and a front downstream divisional shaft 38b. Further, in clutch-brake unit casing 39a, drive mode selection clutch 40 is interposed between upstream and downstream divisional shafts 38a and 38b, and parking brake 41 is provided on downstream divisional shaft 38a. In this way, clutch-brake unit 39 includes clutch-brake unit casing 39a, drive mode selection clutch 40 and parking brake 41.

Rear upstream divisional shaft 38a projects rearward from clutch-brake unit casing 39a so as to serve as the rear end of front transaxle input shaft 38 joined to propeller shaft 36 via universal joint 37. Front upstream divisional shaft 38b projects forward from clutch-brake unit casing 39a into a front transaxle casing 7a of front transaxle 7.

Referring to FIG. 1, a differential unit 43 is disposed in front transaxle casing 7a. In front transaxle casing 7a, a bevel pinion 42 is fixed on a front end of downstream divisional shaft 38b and meshes with a differential input gear 44 of differential unit 43. Differential unit 43 differentially connects proximal ends of right and left differential yoke shafts 45 to each other. Right and left differential yoke shafts 45 project rightward and leftward from front transaxle casing 7a and are joined at distal ends thereof to respective axles 8a of right and left front drive wheels 8 via respective propeller shafts 47 and universal joints 46 and 48.

More specifically, differential unit 43 is a limited slip differential unit that restricts differential rotatability of right and left differential yoke shafts 45.

Referring to FIG. 3, alternatively, a differential unit 60 provided with a differential locking system 64 may be disposed in front transaxle casing 7a. Differential unit 60 is a normal differential gear unit having differential pinions 62 and differential side gears 63 fixed on proximal ends of differential yoke shafts 45. In this case, vehicle 100 is provided with a differential locking manipulator such as a lever or a pedal for selecting whether or not differential locking system 64 is activated to lock the differential rotation of right and left front drive wheels 8. In addition, as discussed later, controller 50 controls differential locking system 64 so that differential locking system 64 is automatically activated to lock the differential rotation of front drive wheels 8 once parking brake 41 is activated to brake front transaxle input shaft 38.

Referring to FIGS. 4 to 12 illustrating a concrete structure of clutch-brake unit 39 as shown in FIG. 3, a main embodiment of clutch-brake unit 39 will be described. Clutch-brake unit casing 39a of clutch-brake unit 39 is fitted at a front end thereof into a rear opening of front transaxle casing 7a of front transaxle 7 (including either differential unit 43 or 60) and is fastened to front transaxle casing 7a by bolts, so that casings 7a and 39a are combined to serve as an integral casing of front transaxle 7 and clutch-brake unit 39. In other words, front transaxle 7 and clutch-brake unit 39 are combined into an assembly serving as a drive unit 110. Conversely, drive unit 110 can be easily divided into front transaxle 7 and clutch-brake unit 39 by detaching casing 39a from casing 7a.

Referring to FIGS. 4 to 7 and 9 to 11, clutch-brake unit casing 39a includes a main housing 39b incorporating front transaxle input shaft 38, a clutch housing 39c incorporating a clutch operation mechanism 80 and a brake housing 39d incorporating a brake operation mechanism 90. Main casing 39a has an upwardly open horizontal top opening. Brake housing 39d is joined to main housing 39b so as to cover the top opening of main housing 39b. A front portion of clutch housing 39d is expanded upward so as to define a chamber for incorporating bake operation mechanism 90. Clutch housing 39c is mounted on a rear portion of brake housing 39d joined to main housing 39h so as to define a chamber for incorporating clutch operation mechanism 80.

A front end of upstream divisional shaft 38a of front transaxle input shaft 38 is formed with a projection. A rear end of downstream divisional shaft 38b of front transaxle input shaft 38 is formed with a recess. The projection is inserted into the recess so that upstream divisional shaft 38a and downstream divisional shaft 38b are coaxially joined to each other so as to be rotatable relative to each other.

Figure 5:
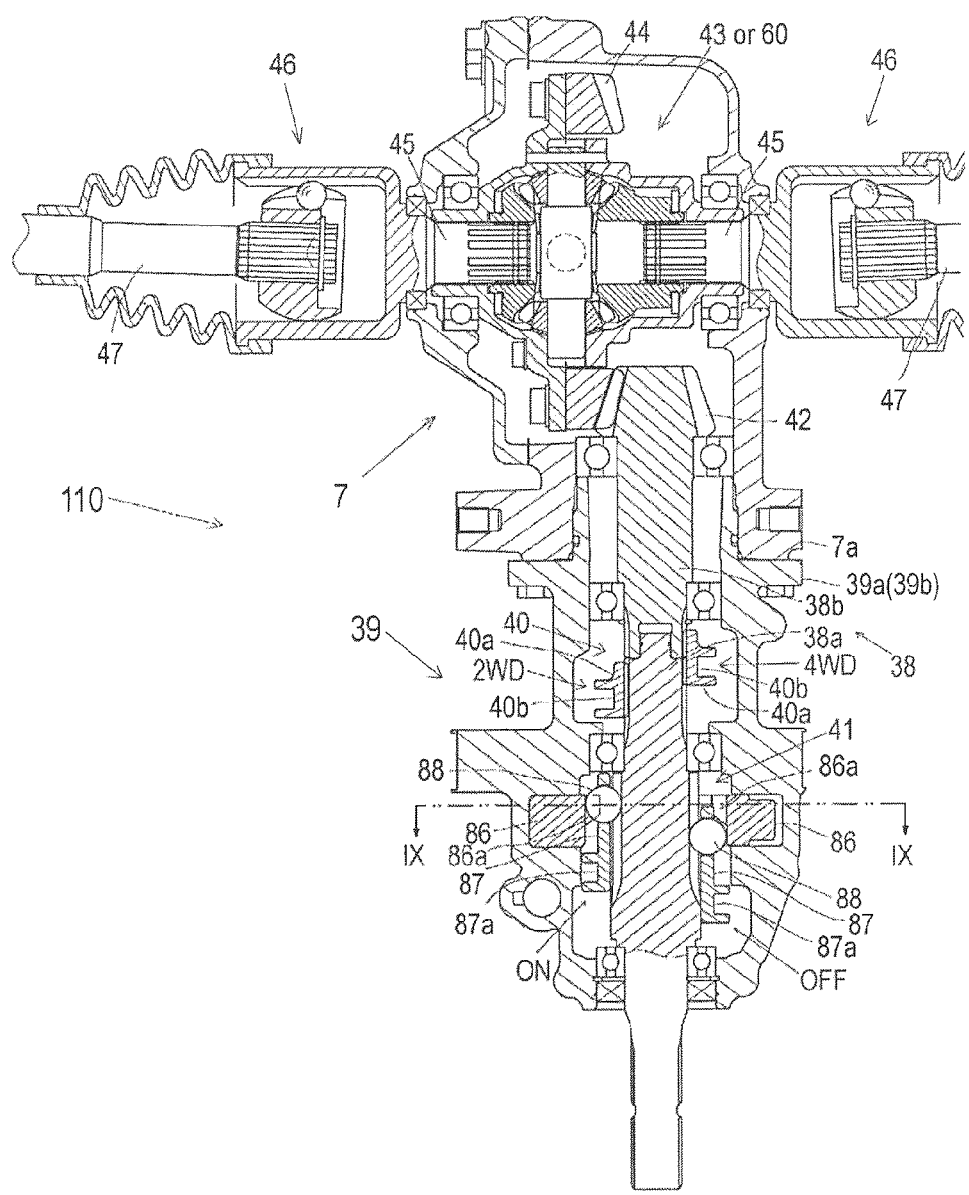
FIG. 5 is a sectional plan view of the drive unit.
Figure 6:
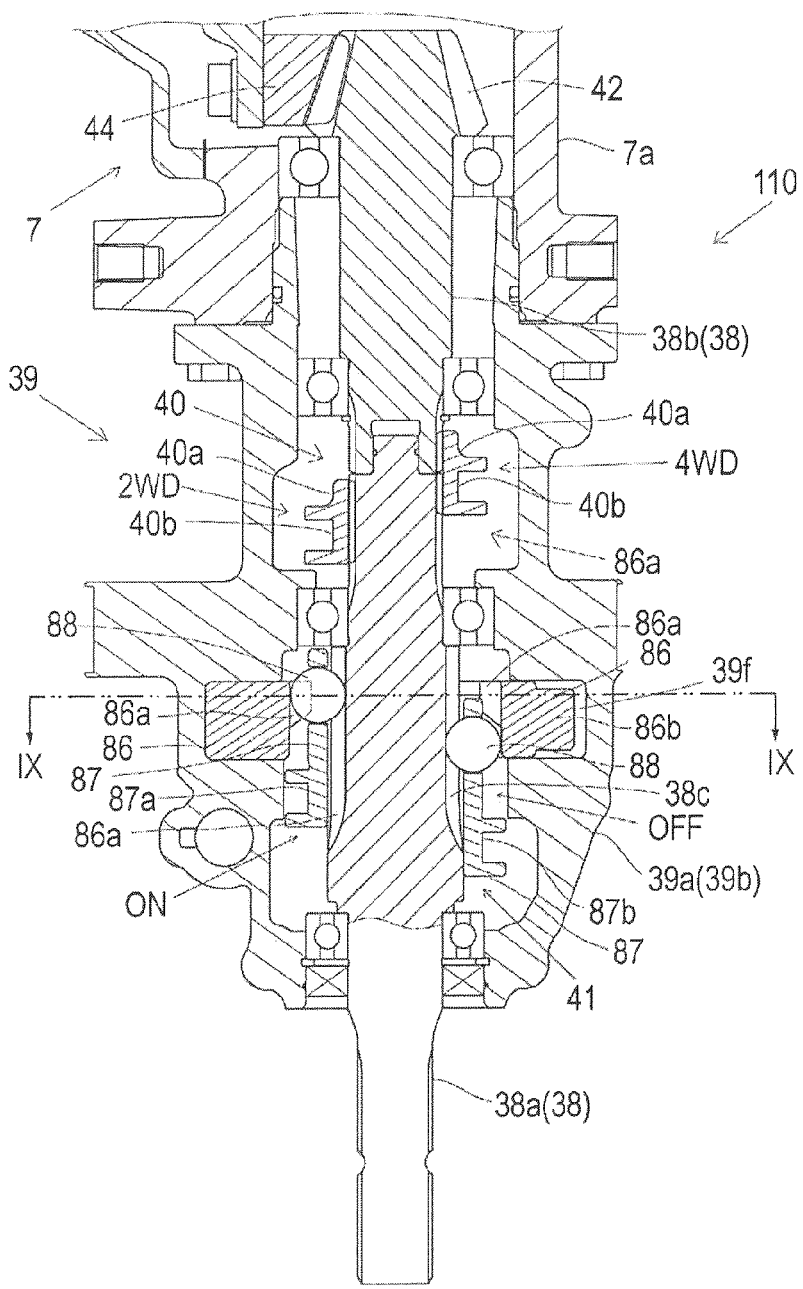
FIG. 6 is an enlarged sectional plan view of a principal portion of the drive unit mainly showing the clutch-brake unit.

Referring to FIGS. 5 and 6, clutch 40 will be described. A front end portion of upstream divisional shall 38a and a rear end portion of downstream divisional shaft 38b have splined peripheral surfaces. Clutch 40 includes the splined peripheral surfaces of divisional shafts 38a and 38b and a clutch slider 40a. Clutch slider 40a is constantly fitted on the splined peripheral surface of upstream divisional shaft 38a unrotatably relative to upstream divisional shaft 38a and axially slidably along upstream divisional shaft 38a. Clutch slider 40a is shiftable between a 2WD mode position (referred to as "2WD" in FIGS. 5 and 6) and a 4WD mode position (referred to as "4WD" in FIGS. 5 and 6). In this regard, for convenience of illustration, a part of clutch slider 40a appearing on one radial side of front transaxle input shaft 38 is illustrated as being set at the 2WD mode position, and another part of clutch slider 40a appearing on the other radial side of front transaxle input shaft 38 is illustrated as being set at the 4WD mode position.

When clutch slider 40a is set at the 2WD mode position, clutch slider 40a fitted on the splined peripheral surface of upstream divisional shaft 38a is not fitted on the splined peripheral surface of downstream divisional shaft 38b, thereby isolating downstream divisional shaft 38b and differential unit 43 or 60 from the rotary power of upstream divisional shaft 38a. When clutch slider 40a is set at the 4WD mode position, clutch slider 40a fitted on the splined peripheral surface of upstream divisional shaft 38a is also fitted on the splined peripheral surface of downstream divisional shaft 38b, thereby transmitting the rotary power of upstream divisional shaft 38a to downstream divisional shaft 38b and differential unit 43 or 60, and thereby driving right and left front drive wheels 8.

Figure 7:
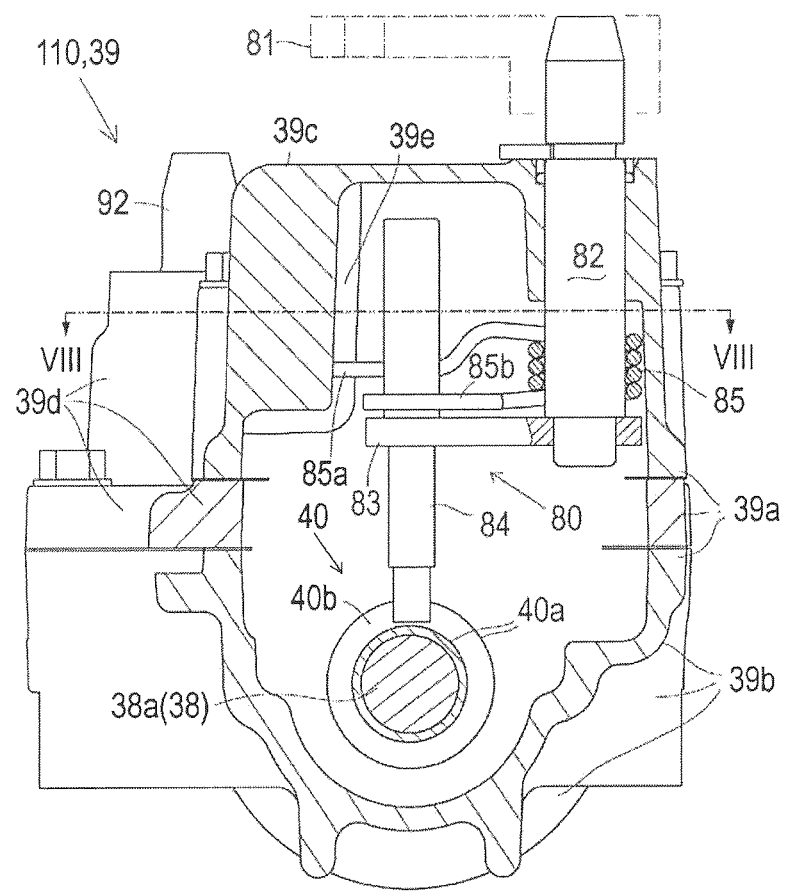
FIG. 7 is a cross sectional view taken along VII-VII line of FIG. 4 showing an operation mechanism for a drive mode selection clutch in the clutch-brake unit.
Figure 8:
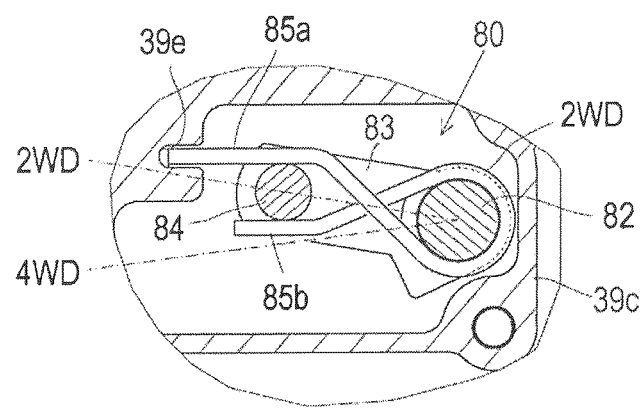
FIG. 8 is a cross sectional view taken along VIII-VIII line of FIG. 7.

Referring to FIGS. 7 and 8, clutch operation mechanism 80 for mode selection clutch 40 will be described. A vertical clutch operation shaft 82 is journalled by clutch housing 39c and a top end portion of clutch operation shaft 82 projects upwardly outward from clutch-brake unit casing 39a so as to be fixedly provided thereon with a clutch operation arm 81 illustrated in phantom lines in FIG. 7. Clutch operation arm 81 is connected to an unshown actuator controlled by controller 50 in response to the manipulation of drive mode selection lever 54. Alternatively, clutch operation arm 81 may be connected to drive mode selection lever 54 via a mechanical linkage.

In clutch-brake unit casing 39a, a connection arm 83 is horizontally extended to be fixed at one end portion thereof to a bottom end portion of clutch operation shaft 82 and to be fixed at the other end portion thereof to an axial intermediate portion of a vertical clutch slider moving shaft 84. Therefore, when clutch operation arm 81 and clutch operation shaft 82 rotate, connection arm 83 and clutch slider moving shaft 84 rotate together with clutch operation shaft 82 so that the rotation of clutch slider moving shaft 84 is centered on the vertical axis of clutch operation shaft 82. A bottom end portion of clutch slider moving shaft 84 is fitted into an annular groove 40b of clutch slider 40a so that clutch slider 40a axially slides along front transaxle input shaft 38 according to the rotation of clutch slider moving shaft 84 centered on the axis of clutch operation shaft 82.

In the chamber defined by clutch housing 39c, a spring 85 is coiled on clutch operation shaft 82. End portions 85a and 85b of spring 85 are twisted to cross each other, and are extended to have clutch slider moving shaft 84 therebetween. Spring 85 has a force for biasing end portions 85a and 85b toward each other. One end portion 85a of spring 85 is fitted into a groove 39e formed in clutch housing 39c so as to be fixed in location, while the other end portion 85b is movable following the rotation of clutch slider moving shaft 84.

Initially, when no operation force is applied to clutch operation arm 81, the biasing force of spring 85 holds end portions 85a and 85b of spring 85 pinch clutch slider moving shaft 84. This position referred to as "2WD" in FIG. 8 where clutch slider moving shaft 84 is pinched between end portions 85a and 85b is a 2WD mode position of clutch slider moving shaft 84 corresponding to the 2WD mode position of clutch slider 40a referred to as "2WD" in FIGS. 5 and 6.

When an operation force is applied to clutch operation arm 81, clutch slider moving shaft 84 rotates together with clutch operation arm 81 and clutch operation shaft 82 so that clutch slider moving shaft 84 moves to a position referred to as "4WD" in FIG. 8 so as to push movable end portion 85b away from fixed end portion 85a against the biasing force of spring 85. In this regard, the biasing force of spring 85 keeps clutch slider 40a at the 2WD mode position until clutch slider 40a comes to successfully spline-fit downstream divisional shaft 38b. This position of clutch slider moving shaft 84 referred to as "4WD" in FIG. 8 is a 4WD mode position of clutch slider moving shaft 84 corresponding to the 4WD mode position of clutch slider 40a referred to as "4WD" in FIGS. 5 and 6. Therefore, due to the biasing force of spring 85, clutch slider moving shaft 84 having been set at the 4WD mode position returns to the 2WD mode position as soon as clutch operation arm 81 is released from the operational force.

Figure 9:
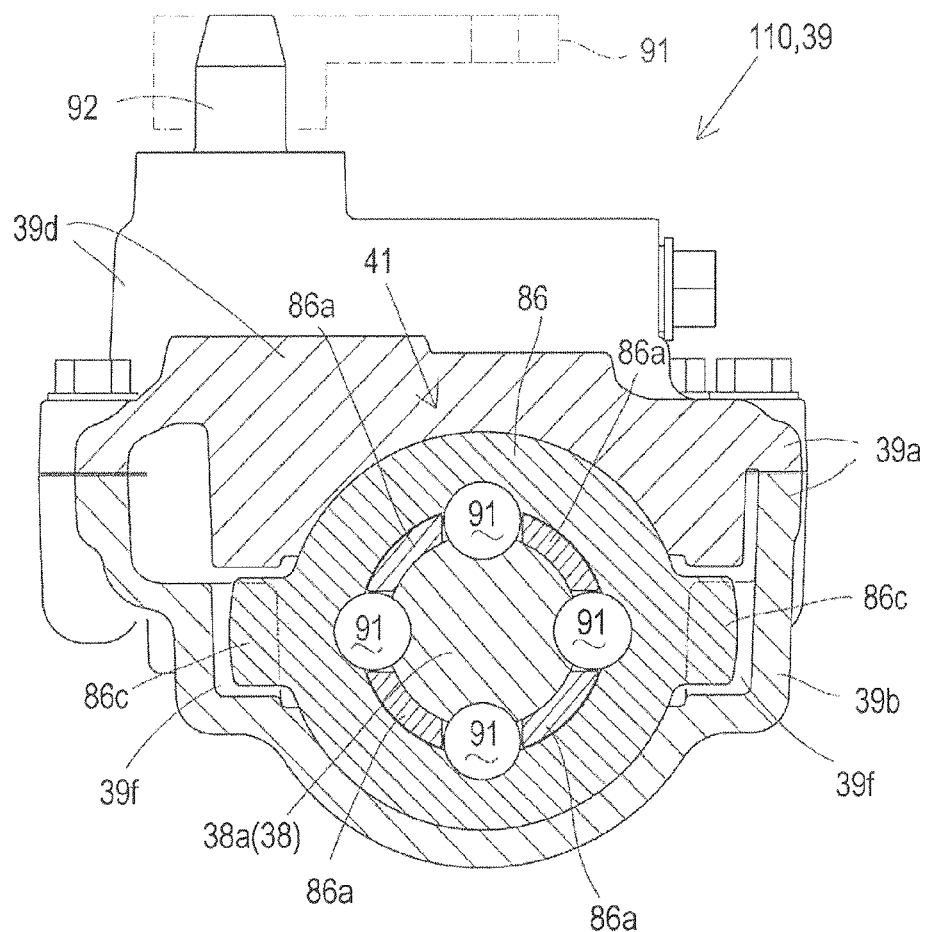
FIG. 9 is a cross sectional view taken along IX-IX line of FIGS. 5 and 6 showing a parking brake in the clutch-brake unit.
Figure 10:
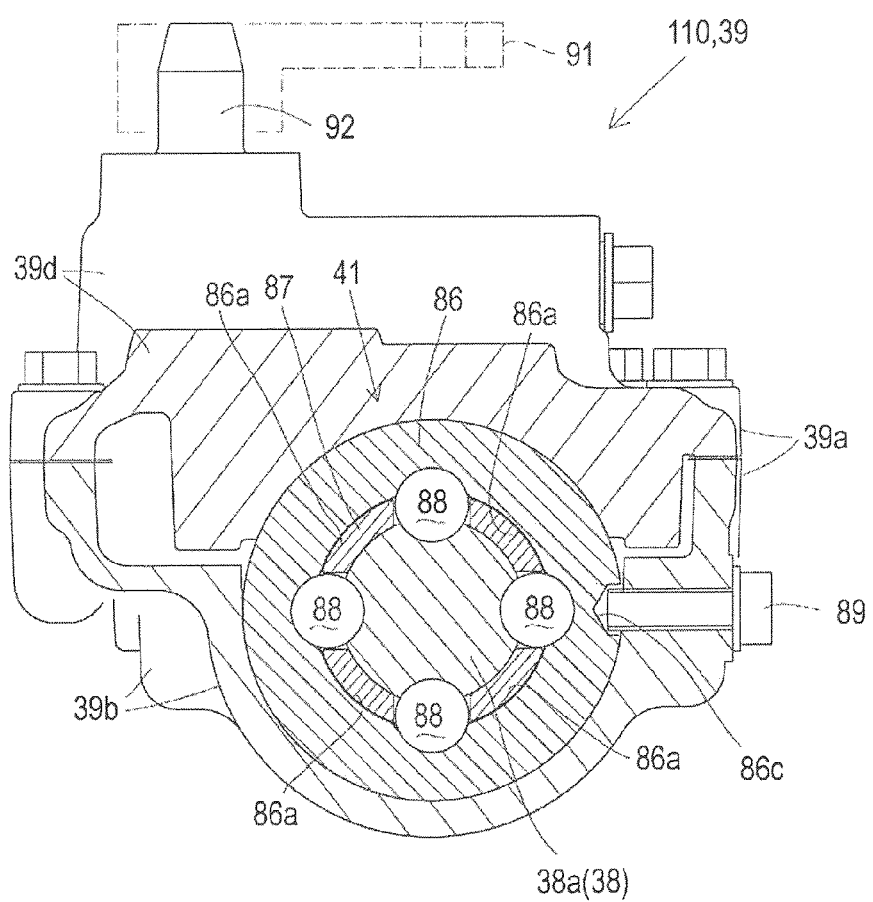
FIG. 10 is a cross sectional view taken along IX-IX line of FIGS. 5 and 6 showing an alternative parking brake in the clutch-brake unit.

Referring to FIGS. 5, 6, 9 and 10, parking brake 41 will be described. Parking brake 41 includes a locking block 86, locking slider 87 and balls 88. Locking block 86 is a ring-shaped member fixed to clutch-brake unit casing 39a. In this regard, as shown in FIG. 9, locking block 86 is formed with retaining pawls 86b that are fitted into respective grooves 39f formed in brake housing 39d so as to be unrotatable relative to clutch-brake unit casing 39a. Alternatively, as shown in FIG. 10, locking block 86 may be formed with a recess 86c into which a bolt 89 screwed through brake housing 39d is inserted at an inner end thereof. If a torque containment between locking block 86 and balls 88 occurs so as to disenable a later-discussed unbraking operation of parking brake 41, bolt 89 can be screwed to be removed from recess 86c so as to release parking brake 41 from the locking state.

Cylindrical locking slider 87 is disposed around upstream divisional shaft 38a. Locking slider 87 holds a plurality of halls 88 rotatably relative to locking slider 87. In this embodiment, four balls 88 are held by locking slider 87 so as to be aligned at regular intervals in the peripheral direction of upstream divisional shaft 38a. In correspondence to respective balls 88, sectionally semicircular grooves 38c are formed on the outer peripheral surface of upstream divisional shaft 38a rearward from the splined peripheral surface of upstream divisional shaft 38a constituting drive mode selection clutch 40, so as to be extended in the axial direction of upstream divisional shaft 38a. Inner half portions of balls 88 project centripetally from an inner peripheral surface of locking slider 87 toward the axis of upstream divisional shaft 38a and are fitted into respective grooves 38c so that the semicircular shape of the inner half portion of each hall 88 substantially coincides to the semicircular shape of corresponding groove 38c in section, whereby locking slider 87 is disposed to have its inner peripheral surface close to the outer peripheral surface of upstream divisional shaft 38a so as to be unrotatable relative to upstream divisional shaft 38a and slidable along upstream divisional shaft 38a, and balls 88 are rollable in respective grooves 38c so as to guide the slide of locking slider 87 in the axial direction of upstream divisional shaft 38a.

Locking block 86 has an inner peripheral surface disposed around upstream divisional shaft 38a. A rear portion of locking block 86 is entirely covered in the peripheral direction thereof with this inner peripheral surface. On the other hand, a front portion of locking block 86 is formed with centripetally projecting locking pawls 86a. Locking pawls 86a are aligned in the peripheral direction of locking block 86 so as to have gaps among locking pawls 86a. The inner peripheral surface of locking block 86 defines these gaps among locking pawls 86a at the front portion of locking block 86.

In the radial direction of upstream divisional shaft 38a, locking slider 87 holding balls 88 is disposed between the inner peripheral surface of locking block 86 and the outer peripheral surface of upstream divisional shaft 38a. Locking pawls 86a of locking block 86 project toward an outer peripheral surface of locking slider 87. Outer half portions of balls 88 project centrifugally from the outer peripheral surface of locking slider 87 toward the inner peripheral surface of locking block 86. The centripetal projection degree of locking pawls 86a substantially corresponds to the centrifugal projection degree of the outer half portions of balls 88, so that balls 88 are close to the inner peripheral surface of locking block 86 in the radial direction of upstream divisional shaft 38a.

The gaps among locking pawls 86a aligned on the periphery of locking block 86 are provided for passing respective balls 88 when locking slider 87 slides in the axial direction of upstream divisional shaft 38a. In the axial direction of upstream divisional shaft 38a, locking slider 87 is shiftable between a locking (braking) position referred to as "ON" in FIGS. 5 and 6 and an unlocking (unbraking) position referred to as "OFF" in FIGS. 5 and 6. In this regard, for convenience of illustration, a part of locking slider 87 appearing on one radial side of upstream divisional shaft 38a is illustrated as being set at the locking position, and another part of locking slider 87 appearing on the other radial side of upstream divisional shaft 38a is illustrated as being set at the unlocking position.

The fore-and-aft slide range of locking slider 87 in the axial direction of upstream divisional shaft 38a is defined at its front end as the locking position and at its rear end as the unlocking position. When locking slider 87 is set at the locking position, balls 88 are disposed in the gaps among locking pawls 86a inside of the inner peripheral surface of locking block 86, so that locking pawls 86a hinder balls 88 from moving in the peripheral direction of upstream divisional shaft 38a, whereby locking block 86 fixed to clutch-brake unit casing 39a brakes upstream divisional shaft 38a that engages with locking slider 87 via balls 88 unrotatably relative to locking slider 87.

When locking slider 87 is set at the unlocking position, balls 88 are disposed rearward from locking pawls 86a inside of the inner peripheral surface of locking block 86, so that balls 88 are movable in the peripheral direction of upstream divisional shaft 38a freely from locking pawls 86a, thereby allowing locking slider 87 and upstream divisional shaft 38a to rotate freely from locking block 86 fixed to clutch-brake unit casing 39a.

Incidentally, rear end portions of locking pawls 86a are tapered in the axial direction of upstream divisional shaft 38a so as to guide balls 88 to enter the gaps among locking pawls 86a when locking slider 87 is shifted from the unlocking position to the locking position.

Figure 11:
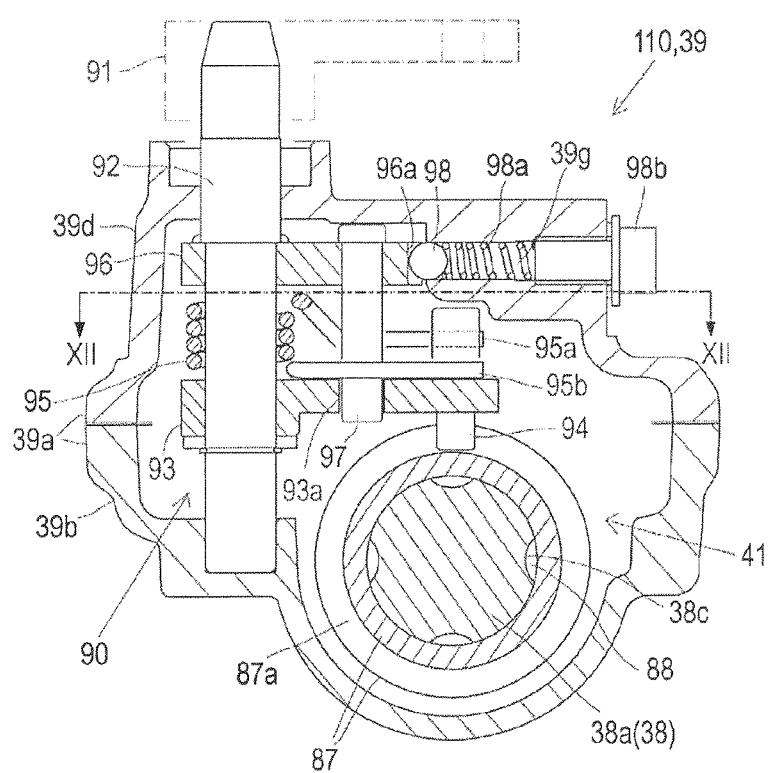
FIG. 11 is a cross sectional view taken along XI-XI line of FIG. 4 showing an operation mechanism for the parking brake.
Figure 12:
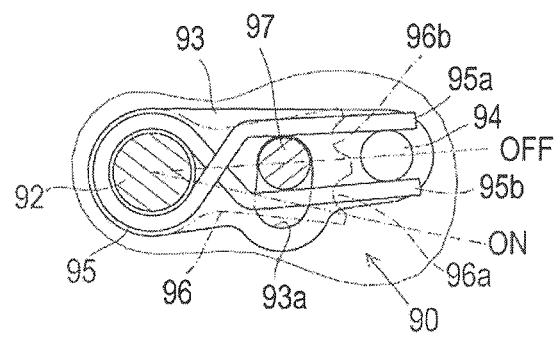
FIG. 12 is a cross sectional view taken along XII-XII line of FIG. 11.

Referring to FIGS. 11 and 12, brake operation mechanism 90 for parking brake 41 will be described. A vertical brake operation shaft 92 is journalled by brake housing 39d and a top end portion of brake operation shaft 92 projects upwardly outward from casing 39a so as to be fixedly provided thereon with a brake operation arm 91 illustrated in phantom lines in FIG. 11. Brake operation arm 91 is connected to an unshown actuator controlled by controller 50 based on the manipulation of parking brake lever 55. Alternatively, brake operation arm 91 may be connected to parking brake lever 55 via a mechanical linkage.

In clutch-brake unit casing 39a, a connection arm 93 is horizontally extended, is fitted at one end portion thereof to a bottom end portion of brake operation shaft 92 rotatably relative to brake operation shaft 92, and is fixed at the other end portion thereof to an axial intermediate portion of a vertical locking slider moving shaft 94. Therefore, connection arm 93 and locking slider moving shaft 94 are rotatably centered on the vertical axis of brake operation shaft 92, while connection arm 93 and locking slider moving shaft 94 are allowed to rotate relative to brake operation shaft 92. As shown in FIGS. 5 and 6, an annular groove 87a is formed on a rear end portion of locking slider 87 that constantly projects rearward from locking block 86 regardless of whether locking slider 87 is set at the unlocking position or the locking position. A bottom end portion of locking slider moving shaft 94 is fitted into annular groove 87a of locking slider 87 so that locking slider 87 axially slides along upstream divisional shaft 38a according to the rotation of locking slider moving shaft 94 centered on the axis of brake operation shaft 92.

In the chamber defined by brake housing 39d, a detent arm 96 is horizontally extended, is fixed at one end portion thereof to an axial intermediate portion of brake operation shaft 92, and is fixed at the other end portion thereof to a top portion of a vertical connection rod 97. Therefore, when brake operation arm 91 and brake operation shaft 92 are rotated, detent arm 96 and connection rod 97 are rotated together with brake operation arm 91 and brake operation shaft 92, while the vertical axis of brake operation shaft 92 serves as a fulcrum for the rotation of detent arm 96 and connection rod 97. A bottom end portion of connection rod 97 is fitted into a slot 93a formed in an intermediate portion of connection arm 93 between brake operation shaft 92 and locking slider moving shaft 94. Slot 93a is extended along the rotational direction of connection arm 93 so as to define a range for allowing the rotation of connection rod 97 centered on the axis of brake operation shaft 92 relative to the rotation of connection arm 93 centered on the axis of brake operation shaft 92.

The foresaid other end portion of detent arm 96 is extended further from the top portion of connection rod 97 so as to have an edge formed with semicircular detent recesses 96a and 96b. A hole 39g is formed through a wall of brake housing 39d. A detent ball 98 and a detent spring 98a are fitted in hole 39g so that detent spring 98a presses detent ball 98 into either detent recess 96a or 96b. Detent ball 98 fitted in detent recess 96a defines an unlocking (unbraking) position of brake operation arm 91, detent arm 96 and connection rod 97 referred to as "OFF" in FIG. 12. Detent ball 98 fitted in detent recess 96b defines a locking (braking) position of brake operation arm 91, detent arm 96 and connection rod 97 referred to as "ON" in FIG. 12. An adjusting bolt 98b is screwed from the outside of clutch-brake unit casing 39a into hole 39g so as to plug the outer opening of hole 39g.

A spring 95 is coiled on an axially intermediate portion of brake operation shaft 92 between connection arm 93 and detent arm 96. End portions 95a and 95b of spring 95 are twisted to cross each other, and are extended to have locking slider moving shaft 94 and connection rod 97 therebetween. Spring 95 has a force for biasing end portions 95a and 95b toward each other, i.e., in the direction for pinching locking slider moving shaft 94 and connection rod 97 therebetween.

Unless parking brake lever 55 is manipulated for braking, brake operation arm 91, detent arm 96 and connection rod 97 are kept at the unlocking position referred to as "OFF" in FIG. 12. In this state, the biasing force of spring 95 holds end portions 95a and 95b of spring 95 pinch locking slider moving shaft 94 and connection rod 97. The position of locking slider moving shaft 94 pinched together with connection rod 97 at the unlocking position between end portions 95a and 95b of spring 95 is defined as an unlocking position of locking slider moving shaft 94 which correspond to the unlocking position of locking slider 87 referred to as "OFF" in FIGS. 5 and 6.

When parking brake lever 55 is manipulated, brake operation arm 91, detent arm 96 and connection rod 97 are rotated from the unlocking position to the locking position referred to as "ON" in FIG. 12, so that connection rod 97 pushes one end portion 95b against the biasing force of spring 95. Even if detent arm 96 and connection rod 97 reaches their locking position, the range in slot 93a for rotating connection rod 97 relative to connection arm 93 allows locking slider 87 to remain at its unlocking position referred to as "OFF" in FIGS. 5 and 6 before the rotational position of balls 88 comes to coincide to the gaps among locking pawls 86a. In this state, connection rod 97 moving from its unlocking position to its locking position pushes end portion 95b away from end portion 95a held by locking slider moving shaft 94 remaining at its unlocking position, thereby causing a biasing force of spring 95 applied to end portion 95a toward end portion 95b pressed by connection rod 97. Therefore, even if locking slider 87 is left at the unlocking position, a force from the ground rotates propeller shafts 47 so that as soon as the rotational position of balls 88 of locking slider 87 at the unlocking position comes to coincide to the gaps among locking pawls 86a, end portion 95a of spring 95 moves toward end portion 95b of spring 95 so as to push locking slider moving shaft 94 to its locking position. Finally, locking slider moving shaft 94 reaches its locking position corresponding to the locking position of connection rod 97 and detent arm 96, thereby surely setting locking slider 87 at the locking position referred to as "ON" in FIGS. 5 and 6.

FIGS. 4 to 12 do not illustrate drive mode selection clutch 40 as being associated in structure with parking brake 41, however, controller 50 associates the shift of clutch slider 41a with the shift of locking slider 87 so that clutch slider 40a having been set at the 2WD mode position is forcibly shifted to the 4WD mode position according to an operation of parking brake 41 for braking. In this regard, controller 50 may shift clutch slider 40a to the 4WD mode position in response to an operation signal for shifting brake operation arm 91 to the locking position of brake operation arm 91, or in response to an actual shift of locking slider 87 to the locking position of locking slider 87.

Therefore, once parking brake 41 is activated to brake upstream divisional shaft 38a, drive mode selection clutch 40, even if it has been disengaged to isolate downstream divisional shaft 38b from the torque of upstream divisional shaft 38a, is forcibly engaged to drivingly connect downstream divisional shaft 38b to upstream divisional shaft 38a, thereby transmitting the braking force applied on upstream divisional shaft 38*a* to front drive wheels 8 via downstream divisional shaft 38*b* and front transaxle 7, i.e., applying the braking force to all rear and front drive wheels 6 and 8 of vehicle 100 for surely park-locking vehicle 100.

More specifically, the braking force applied to upstream divisional shaft 38*a* is surely distributed to right and left rear drive wheels 6 via propeller shaft 36, transmission output shaft 19 and rear transaxle 5 (having no differential unit). On the other hand, if vehicle 100 employs limited slip differential unit 43 as shown in FIG. 1, limited slip differential unit 43 functions to restrict the differential rotation of right and left front drive wheels 8 so as to apply the braking force to both right and left front drive wheels 8 from upstream divisional shaft 38*a* braked by parking brake 41 (set in the locking (braking) state) via engaged drive mode selection clutch 40 (set in the 4WD mode state). If vehicle 100 employs differential unit 60 including differential lock system 64 as shown in FIG. 3, the same braking effect to both right and left front drive wheels 8 can be obtained by setting differential locking system 64 to the differential locking state. Controller 50 may automatically set differential locking system 64 to the differential locking state according to the shift of parking brake 41 to the locking state.

Figure 13:
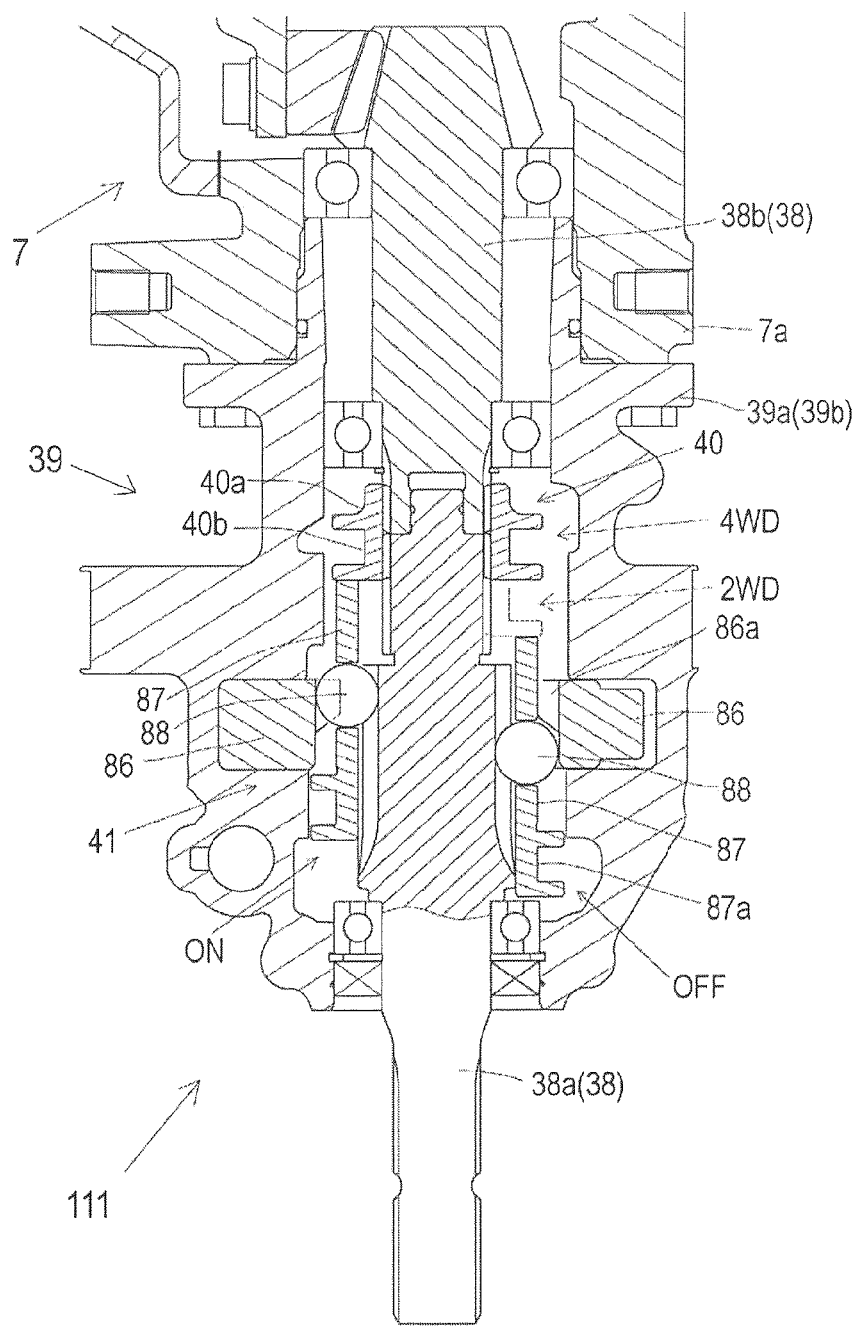
FIG. 13 is an enlarged sectional plan view of a principal portion of an alternative drive unit including the front transaxle and an alternative clutch-brake unit, mainly showing the alternative clutch and brake system.

Alternatively, referring to FIG. 13, an alternative drive unit 111 is similar to drive unit 110 excluding that clutch-brake unit 39 is configured according to a second embodiment so as to mechanically associate the shift of clutch slider 41 with the shift of locking slider 87 without the controlling by controller 50. In this regard, in clutch-brake unit 39 according to the main embodiment as shown in FIGS. 5 and 6, a bearing 59 journalling an axial intermediate portion of upstream divisional shaft 38*a* partitions the inner space of clutch-brake unit casing 39*a* into a front clutch chamber incorporating drive mode selection clutch 40 and a rear brake chamber incorporating parking brake 41. On the contrary, in clutch-brake unit 39 according the second embodiment as shown in FIG. 13, such a hearing 59 is removed and locking slider 87 is extended forward (or clutch slider 40*a* is extended rearward) so as to enable a front end of locking slider 87 and a rear end of clutch slider 40*a* to contact each other.

More specifically, in the embodiment of FIG. 13, clutch slider 40*a* and locking slider 87 are located relative to each other in the axial direction of upstream divisional shaft 38*a* so that the front end of locking slider 87 set at the unlocking position (referred to as "OFF" in FIG. 13) contacts the rear end of clutch slider 40*a* set at the 2WD mode position (illustrated in phantom lines in FIG. 13 and referred to as "2WD" in FIG. 13). Therefore, when locking slider 87 having been set at the unlocking position moves forward to the locking position (referred to as "ON" in FIG. 13), clutch slider 40*a* having been set at the 2WD mode position is pushed forward to the 4WD mode position (referred to as "4WD" in FIG. 13) by locking slider 87. In this regard, clutch-brake unit 39 configured as shown in FIG. 13 also functions to automatically set drive mode selection clutch 40 to the 4WD mode state according to the braking operation of parking brake 41.

Conversely, in the embodiment of FIG. 13, while locking slider 87 is set at the unlocking position, clutch slider 40*a* can be optionally set at either the 2WD mode position or the 4WD mode position. Further, clutch slider 40*a* having been set at the 4WD mode position can be shifted rearward to the 2WD mode position only if locking slider 87 is set at the unlocking position. In other words, vehicle 100 can be set in the 2WD mode unless parking brake 41 is set to brake upstream divisional shaft 38*a*.

Figure 14:
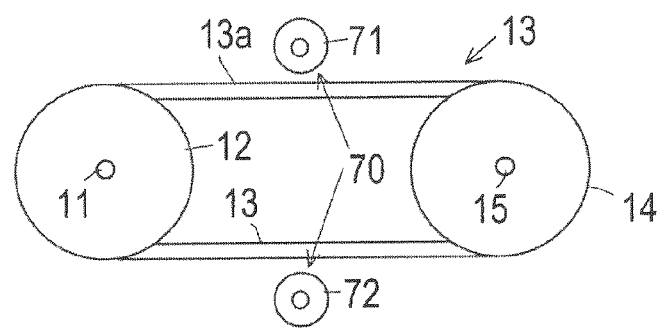
FIG. 14 is a schematic view of a CVT of the power unit provided with an alternative parking brake when the parking brake is set in an unbraking state.
Figure 15:
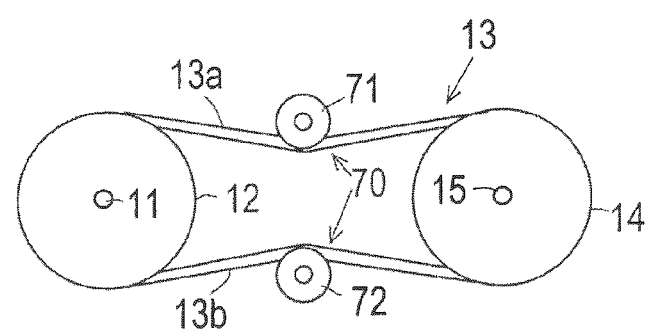
FIG. 15 is a schematic view of the CVT of FIG. 14 when the parking brake is set in a braking state.

Referring to FIGS. 14 and 15, an alternative parking brake 70 may be provided in CVT 3. Parking brake 70 includes upper and lower tension pulleys 71 and 72 adjacent to upper and lower portions 13*a* and 13*b* of belt 13. Upper and lower tension pulleys 71 and 72 are operatively connected to an actuator (not shown) operated according to manipulation of parking brake lever 55. FIG. 14 illustrates parking brake 70 set in an unbraking state where upper pulley 71 is spaced upward from upper portion 13*a* of belt 13 and lower pulley 72 is spaced downward from lower portion 13*b* of belt 13 so that belt 13 is free from tension pulleys 71 and 72. FIG. 15 illustrates parking brake 70 set in a braking state where upper pulley 71 is moved downward to be pressed against upper portion 13*a* of belt 13 and lower pulley 71 is moved upward to be pressed against lower portion 13*b* of belt 13. Parking brake 70 is set into the braking state by manipulating parking brake lever 55 for braking. The braking force applied onto belt 13 by parking brake 70 is transmitted to right and left rear drive wheels 6 via gear transmission 4 and rear transaxle 5. Also, this braking force is transmitted to right and left front drive wheels 8 via gear transmission 4 and front transaxle 7 only if drive mode selection clutch 40 is engaged to realize the 2WD mode.

Drive mode selection clutch 40 may be controlled by controller 50 so that drive mode selection clutch 40 is automatically shifted to the 4WD mode state according to the braking operation of parking brake lever 55 to shift parking brake 70 to the braking state. Further, in association with parking brake 70 provided in CVT 3, clutch-brake unit 39 having drive mode selection clutch 40 can be minimized because it does not need parking brake 41.

As described above, four-wheel drive vehicle 100 is advantageous in the automatic engagement of drive mode selection clutch 40 (to the 4WD mode state) in response to the shift of parking brake 41 or 70 to the braking state. In this regard, parking brake 41 or 70 assists the braking of drive wheels 6 and 8 with brakes 6*b* and 8*b* that may have small capacities for minimization. For example, when vehicle 100 has to be stopped on a slope, an operator may need not only depression of brake pedal 52 for applying all brakes 6*b* and 8*b* but also shift of parking brake lever 55 from the unbraking position to the braking position so as to surely stop vehicle 100 on the slope. However, if drive mode selection clutch 40 is set in the 2WD mode state (disengagement state) to isolate front drive wheels 8 from the torque of transmission output shaft 19, the braking force caused by parking brake 41 or 70 is transmitted to only rear drive wheels 6 insufficiently to stop vehicle 100.

In this case, if vehicle 100 were not provided with drive mode selection clutch 40 that is automatically shifted to the 4WD mode state (engagement state) in response to the shift of parking brake 41 or 70 to the braking state, the operator should manually shift drive mode selection lever 54 from the 2WD mode position to the 4WD mode position so as to apply the braking force of upstream divisional shaft 38*a* to front drive wheels 8 before the operator shifts parking brake lever 55 from the unbraking position to the braking position. As a result, the operator is liable to forget that drive mode selection lever 54 should be manipulated before manipulation of parking brake lever 55, whereby it may happen that front drive wheels 8 are insufficiently braked by only brakes 8*b* without parking brake 41 or 70 while rear drive wheels 6 are braked by brakes 6*b* and parking brake 41 or 70, so that the insufficient braking of front drive wheels 8 may cause vehicle 100 to unexpectedly descend the slope.

Therefore, the automatic shift of drive mode selection clutch 40 to the 4WD mode state (engagement state) in response to the shift of parking brake lever 55 or locking slider 87 to the locking position prevents delay or absence of transmission of the braking force caused by parking brake 41 or 70 to front drive wheels 8, thereby surely braking all drive wheels 6 and 8 by all brakes 6b and 8b and by the braking force caused by parking brake 41 or 70, and thereby surely stopping vehicle 100 on the slope.

It is further understood by those skilled in the art that the foregoing description is given to preferred embodiments of the disclosed apparatus and that various changes and modifications may be made in the invention without departing from the scope thereof defined by the following claims. For example, directions of shafts (such as clutch operation shaft 81) of drive unit 110 are not limited to those as mentioned above.

What is claimed is:

1. A four-wheel drive vehicle comprising:

a power unit including a prime mover, an endless belt type first transmission driven by the prime mover, and a second transmission driven by the first transmission, wherein the second transmission includes a transmission output shaft extended fore-and-aft of the vehicle;

a first transaxle carrying right and left first drive wheels, wherein the first transaxle is disposed on one of front and rear sides of the power unit so as to be drivingly connected to one of front and rear ends of the transmission output shaft;

a second transaxle carrying right and left second drive wheels, wherein the second transaxle is disposed on the other of the front and rear sides of the power unit, wherein the second transaxle includes a transaxle input shaft having an upstream divisional shaft and a downstream divisional shaft that are disposed coaxially to each other, wherein the upstream divisional shaft is drivingly connected to the other of the front and rear ends of the transmission output shaft, and wherein the downstream divisional shaft is drivingly connected to the right and left second drive wheels; and a clutch-brake unit including a clutch and a parking brake, wherein the transaxle input shaft is divided in the clutch-brake unit into the upstream divisional shaft and the downstream divisional shaft, wherein the clutch is interposed between the upstream and downstream divisional shafts and is shiftable between an engagement state for drivingly connecting the downstream divisional shaft to the upstream divisional shaft and a disengagement state for isolating the downstream divisional shaft from a torque of the upstream divisional shaft, wherein the parking brake is disposed on the upstream divisional shaft and is shiftable between a braking state for braking the upstream divisional shaft and an unbraking state for unbraking the upstream divisional shaft, and wherein the clutch is associated with the parking brake so that when the parking brake is shifted to the braking state, the clutch having been set in the disengagement state is automatically shifted to the engagement state.

2. The four-wheel drive vehicle according to claim 1, wherein the second transaxle includes a limited slip differential unit that differentially connect the right and left second drive wheels to each other while the limited slip differential unit restricts the differential rotatability of the right and left second drive wheels.

3. The four-wheel drive vehicle according to claim 1, wherein the second transaxle includes a differential unit differentially connecting the right and left second drive wheels to each other, and wherein the differential unit is provided with a differential locking system that is shiftable between a locking state for preventing the right and left second drive wheels from differentially rotating and an unlocking state for allowing the right and left second drive wheels to differentially rotate, and wherein the differential locking system is associated with the parking brake so that the differential locking system having been set in the unlocking state is automatically shifted to the locking state according to the shift of the parking brake to the braking state.

4. The four-wheel drive vehicle according to claim 1, wherein the second transaxle is more distant from the power unit in the fore-and-aft direction of the vehicle than the first transaxle so that a propeller shaft is interposed between the transmission output shaft and the upstream divisional shaft so as to drivingly connect the upstream divisional shaft to the transmission output shaft.

* * * * *

UNITED STATES PATENT AND TRADEMARK OFFICE
CERTIFICATE OF CORRECTION

| | | |
|---|---|---|
| PATENT NO. | : 8,845,474 B2 | Page 1 of 1 |
| APPLICATION NO. | : 14/193735 | |
| DATED | : September 30, 2014 | |
| INVENTOR(S) | : Kochidomari et al. | |

It is certified that error appears in the above-identified patent and that said Letters Patent is hereby corrected as shown below:

On the Title Page, item (30) Foreign Application Priority Data, please add:
    March 1, 2013   (JP) ..........................2013-040916

In the Specification,

Column 9, Lines 51-52:
    "a plurality of halls" should be --a plurality of balls--

Column 9, Line 65:
    "the inner half portion of each hall" should be --the inner half portion of each ball--

Signed and Sealed this
Fifth Day of May, 2015

Michelle K. Lee
*Director of the United States Patent and Trademark Office*

UNITED STATES PATENT AND TRADEMARK OFFICE
CERTIFICATE OF CORRECTION

PATENT NO.        : 8,845,474 B2  
APPLICATION NO.   : 14/193735  
DATED             : September 30, 2014  
INVENTOR(S)       : Kochidomari et al.

It is certified that error appears in the above-identified patent and that said Letters Patent is hereby corrected as shown below:

On the Title Page, item (73) Assignee, please insert --Hyogo-- before "(JP)"

Signed and Sealed this  
Tenth Day of May, 2016

Michelle K. Lee  
*Director of the United States Patent and Trademark Office*